(12) United States Patent
Rodriguez

(10) Patent No.: US 11,097,175 B2
(45) Date of Patent: Aug. 24, 2021

(54) ACROBATIC TRAINING APPARATUS

(71) Applicant: Miguel Rodriguez, Pomona, CA (US)

(72) Inventor: Miguel Rodriguez, Pomona, CA (US)

( * ) Notice: Subject to any disclaimer, the term of this patent is extended or adjusted under 35 U.S.C. 154(b) by 0 days.

(21) Appl. No.: 15/889,165

(22) Filed: Feb. 5, 2018

(65) Prior Publication Data

US 2018/0236336 A1 Aug. 23, 2018

Related U.S. Application Data

(60) Provisional application No. 62/460,100, filed on Feb. 17, 2017.

(51) Int. Cl.
*A63B 69/00* (2006.01)
*A63B 71/00* (2006.01)
(Continued)

(52) U.S. Cl.
CPC ............ *A63B 69/0064* (2013.01); *A63B 5/16* (2013.01); *A63B 21/4009* (2015.10);
(Continued)

(58) Field of Classification Search
CPC ... A63B 69/0064; A63B 69/0057; A63B 5/16; A63B 21/4009; A63B 21/00181;
(Continued)

(56) References Cited

U.S. PATENT DOCUMENTS 4,934,693 A * 6/1990 Santoro ................ A63B 21/078
482/104
4,976,623 A * 12/1990 Owsley .............. A63B 69/0064
434/247

(Continued)

OTHER PUBLICATIONS

Real Estate Assessor, "Property: 1451 E Franklin St Parcel ID: E0000104007," Year Built 2005 [Extensions], Richmond Virginia Property Search, 3 pages. Retrieved from Internet: https://apps.richmondgov.com/applications/propertysearch/Detail.aspx?pin=E0000104007 (Year: 2005).*

(Continued)

*Primary Examiner* — Megan Anderson
*Assistant Examiner* — Kathleen Vermillera
(74) *Attorney, Agent, or Firm* — Loza & Loza, LLP; Heidi Eisenhut

(57) ABSTRACT

An acrobatic training apparatus for training individuals to perform acrobatic tricks is provided. The apparatus includes a main frame having a first base section having first and second parallel base struts connected by first and second cross member; a platform mounted on the first base section of the main frame; a plurality of elongated vertical members extending vertically upward from the first and second parallel base struts of the first base section; a first upper support member connected between a first pair of elongated vertical support members of the plurality of elongated vertical members; a second upper support member connected between a second pair of elongated vertical support members; a height adjustment mechanism adjustably mounted on the main frame configured to adapt to the height of the user; and a spotting apparatus mounted on the main frame and secured to the height adjustment mechanism.

6 Claims, 10 Drawing Sheets

(51) Int. Cl.
*G09B 19/00* (2006.01)
*A63B 21/00* (2006.01)
*A63B 5/16* (2006.01)
*A63B 21/28* (2006.01)

(52) U.S. Cl.
CPC ...... *A63B 69/0057* (2013.01); *A63B 71/0054* (2013.01); *G09B 19/0038* (2013.01); *A63B 21/00181* (2013.01); *A63B 21/285* (2013.01); *A63B 2225/093* (2013.01); *A63B 2244/12* (2013.01); *A63B 2244/206* (2013.01)

(58) Field of Classification Search
CPC .............. A63B 21/285; A63B 71/0054; A63B 2225/093; A63B 2244/203–206; A63B 2244/12; A63B 23/0233; A63B 23/0238; G09B 19/003; G09B 19/0038; A61H 1/0218; A61H 1/0222; A61H 1/0229
See application file for complete search history.

(56) References Cited

U.S. PATENT DOCUMENTS

| | | | | |
|---|---|---|---|---|
| 5,221,241 | A | * | 6/1993 | Bare, II ............. A63B 69/0064 482/124 |
| 5,403,253 | A | * | 4/1995 | Gaylord .............. A63B 21/068 482/140 |
| 5,788,606 | A | * | 8/1998 | Rich .................. A63B 69/0064 482/27 |
| 8,172,737 | B1 | * | 5/2012 | Nihlman ............ A63B 69/0064 482/144 |
| 8,308,618 | B2 | * | 11/2012 | Bayerlein ........ A63B 21/00181 482/54 |
| 9,259,603 | B2 | * | 2/2016 | Wireman ............. A63B 71/023 |
| 9,272,174 | B2 | * | 3/2016 | Carter .................. A63B 26/003 |
| 2006/0270523 | A1 | * | 11/2006 | Letelleir ................. A63B 4/00 482/23 |
| 2007/0287599 | A1 | * | 12/2007 | Chartrand .............. A63B 69/00 482/23 |
| 2019/0160318 | A1 | * | 5/2019 | Gren E .............. A63B 21/0442 |

OTHER PUBLICATIONS

Screen captures from YouTube video clip entitled "Parkour & Freerunning Calm Pace," 6 pages, uploaded on Feb. 6, 2010 by user"Karric Clato-Day". Retrieved from Internet: https://www.youtube.com/watch?v=kTM8UxFCkKE (Year: 2010).*

* cited by examiner

ACROBATIC TRAINING APPARATUS

CLAIM OF PRIORITY

The present application for patent claims priority to U.S. Provisional Application No. 62/460,100 entitled SOMERSAULT TRAINING DEVICE, filed Feb. 17, 2017, which is hereby expressly incorporated by reference herein.

FIELD

The present disclosure relates to an apparatus for training athletes in the proper mechanics and movement patterns when performing movements in gymnastics, acrobatics, diving and the like, such as a somersault or a flip. In one example, the apparatus of the present disclosure teaches athletes when to open up from a tuck position when performing a somersault or flip to prevent injuries. The apparatus may be used with the assistance of a trainer or an athlete may utilize the apparatus without any assistance.

BACKGROUND

Diving is a sport of jumping or falling into water from a platform or springboard, usually while performing acrobatics. A common acrobatic exercise that divers perform is a flip in which a person's body rotates 360° around a horizontal axis with the feet passing over the head.

To perform the flip off of the diving board, a diver takes off from the diving board and reaches out her hands and begins to shift her center of gravity. After leaving the board, the diver bends at the waist and tucks her knees in, holding her legs with her hands in the tucked position to get enough momentum to flip her body completely. As the diver finishes the rotation she releases her legs from her hands and straightens them as she glides into the water. If the diver opens up from the tuck position too early or too late, the diver may strike the water horizontally which can cause serious injuries, such as broken bones.

To prevent opening up too early or too late, it is critical that the diver receives proper training to be able to identify her orientation properly in the air. As such, what is needed is an acrobatic training apparatus that can train divers to be able to identify their orientation properly in the air so that the divers open up from their tucks at the correct time to safely enter the water.

SUMMARY

The following presents a simplified summary of one or more implementations in order to provide a basic understanding of some implementations. This summary is not an extensive overview of all contemplated implementations, and is intended to neither identify key or critical elements of all implementations nor delineate the scope of any or all implementations. Its sole purpose is to present some concepts of one or more implementations in a simplified form as a prelude to the more detailed description that is presented later.

According to one feature, an acrobatic training apparatus is provided. The acrobatic training apparatus includes a main frame comprising a first base section having first and second parallel base struts connected by a first cross member at a first end and a second cross member connecting the first and second parallel base struts at a second end; a platform mounted on the first base section of the main frame; a plurality of elongated vertical members extending vertically upward from the first and second parallel base struts of the first base section; a first upper support member connected between a first pair of elongated vertical support members of the plurality of elongated vertical members; a second upper support member connected between a second pair of elongated vertical support members of the plurality of elongated vertical members; and a height adjustment mechanism adjustably mounted on the main frame configured to adapt to the height of the user; and a spotting apparatus mounted on the main frame and secured to the height adjustment mechanism.

According to one aspect, the height adjustment mechanism comprises a first pair of spaced apart elongated height adjustment mechanism support members extending vertically upward from the first parallel base strut; and a second pair of spaced apart elongated height adjustment mechanism support members extending vertically upward from the second parallel base strut.

According to another aspect, the height adjustment mechanism further comprises a first slidable support mechanism slidably mounted on the first pair of spaced apart elongated height adjustment mechanism support members; and a second slidable support mechanism slidably mounted on the second pair of spaced apart elongated height adjustment mechanism support members.

According to yet another aspect, the first slideable mechanism comprises a first sleeve; a second sleeve; and a first bearing, the second sleeve connected to the first sleeve by the first bearing; and wherein the first slideable support mechanism is adapted for receiving the first pair of spaced apart elongated height adjustment mechanism support members.

According to yet another aspect, the second slideable mechanism comprises a third sleeve; a fourth sleeve; and a second bearing, the fourth sleeve connected to the third sleeve by the second bearing; and wherein the second slideable support mechanism is adapted for receiving the second pair of spaced apart elongated height adjustment mechanism support members.

According to yet another aspect, the height adjustment mechanism further comprises a control device coupled to the second slideable support member and adapted to vertically move the first pair of spaced apart height adjustment mechanism support members and the second pair of spaced apart height adjustment mechanism support members.

According to yet another aspect, the control device is a wheel.

According to yet another aspect, the height adjustment mechanism further comprises a first mechanical lifting device coupled to the platform on the first base section of the main frame and the second pair of spaced apart elongated height adjustment mechanism support members; and a second mechanical lifting device coupled to the platform on the first base section of the main frame and the first pair of spaced apart elongated height adjustment mechanism support members.

According to yet another aspect, the first mechanical lifting device is a first jack selected from the group consisting of a mechanical jack, a hydraulic jack and a pneumatic jack; and wherein the second mechanical lifting device is a second jack selected from a group consisting of a mechanical jack, a hydraulic jack and a pneumatic jack.

According to yet another aspect, the first jack comprises a base secured to the platform and the second pair of spaced apart elongated height adjustment mechanism support members; a cylinder connected to, an extending vertically upward from, the base; and a vertical lifting ram connected to, and extending vertically upward from, the cylinder to the second slideable support mechanism.

According to yet another aspect, the second jack comprises a base secured to the platform and the first pair of spaced apart elongated height adjustment mechanism support members; a cylinder connected to, an extending vertically upward from, the base; and a vertical lifting ram connected to, and extending vertically upward from, the cylinder to the first slideable support mechanism.

According to yet another aspect, the spotting apparatus is pivotally mounted to the first slideable mechanism by a first horizontal arm extending outwardly from the first bearing; and wherein the spotting apparatus is pivotally mounted to the second slideable mechanism by a second horizontal arm extending outwardly from the second bearing.

According to yet another aspect, the spotting apparatus spins along a horizontal axis and rotates along a vertical axis.

According to yet another aspect, wherein the platform comprises an opening having front end, a back end and a pair of side ends forming a rectangular shape.

According to yet another aspect, the opening has a vertical depth which increases from the front end and the back end towards a middle of the opening where a maximum vertical depth is reached.

According to yet another aspect, a second base section located below and separated from the first base section comprises: a first parallel base strut of the second base section having a first end and an opposing second end; a second parallel base strut of the second base section having a third end and an opposing fourth end; a first cross member of the second base section connected between the first end of the first parallel base strut of the second base section and the third end of the second parallel base strut of the second base section; and a second cross member of the second base section connected between the second end of the first parallel base strut of the second base section and the fourth end of the second parallel base strut of the second base section.

According to yet another aspect, the first base section may be connected to the second base section by the plurality of elongated vertical members.

According to yet another aspect, the second base section is solid and devoid of a base section platform.

According to another feature, an acrobatic training apparatus is provided. The acrobatic training apparatus includes a main frame comprising a first base section having first and second parallel base struts connected by a first cross member at a first end and a second cross member connecting the first and second parallel base struts at a second end; a platform mounted on the first base section of the main frame, the platform comprises an opening having front end, a back end and a pair of side ends forming a rectangular shape where the opening has a vertical depth which increases from the front end and the back end towards a middle of the opening where a maximum vertical depth is reached; a plurality of elongated vertical members extending vertically upward from the first and second parallel base struts of the first base section; a first upper support member connected between a first pair of elongated vertical support members of the plurality of elongated vertical members; a second upper support member connected between a second pair of elongated vertical support members of the plurality of elongated vertical members; a height adjustment mechanism adjustably mounted on the main frame configured to adapt to the height of the user; and a spotting apparatus mounted on the main frame and secured to the height adjustment mechanism. The main frame further comprises a second base section located below and separated from the first base section, the second base section comprises a first parallel base strut of the second base section having a first end and an opposing second end; a second parallel base strut of the second base section having a third end and an opposing fourth end; a first cross member of the second base section connected between the first end of the first parallel base strut of the second base section and the third end of the second parallel base strut of the second base section; and a second cross member of the second base section connected between the second end of the first parallel base strut of the second base section and the fourth end of the second parallel base strut of the second base section.

According to one aspect, the height adjustment mechanism comprises a first pair of spaced apart elongated height adjustment mechanism support members extending vertically upward from the first parallel base strut; a second pair of spaced apart elongated height adjustment mechanism support members extending vertically upward from the second parallel base strut; and a first slidable support mechanism slidably mounted on the first pair of spaced apart elongated height adjustment mechanism support members. The first slidable support mechanism comprises a first sleeve; a second sleeve; and a first bearing, the second sleeve connected to the first sleeve by the first bearing; wherein the first slideable support mechanism is adapted for receiving the first pair of spaced apart elongated height adjustment mechanism support members. The height adjustment mechanism further comprises a second slidable support mechanism slidably mounted on the second pair of spaced apart elongated height adjustment mechanism support members, the second slidable support mechanism comprises a third sleeve; a fourth sleeve; and a second bearing, the fourth sleeve connected to the third sleeve by the second bearing; wherein the second slideable support mechanism is adapted for receiving the second pair of spaced apart elongated height adjustment mechanism support members.

BRIEF DESCRIPTION OF THE DRAWINGS

The features, nature, and advantages of the present aspects may become more apparent from the detailed description set forth below when taken in conjunction with the drawings in which like reference characters identify correspondingly throughout.

DETAILED DESCRIPTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The term "individual" may be refer to an athlete, a user, a diver, a gymnast or any other person who may use the acrobatic training device of the present disclosure.

Overview

Figure 1A:
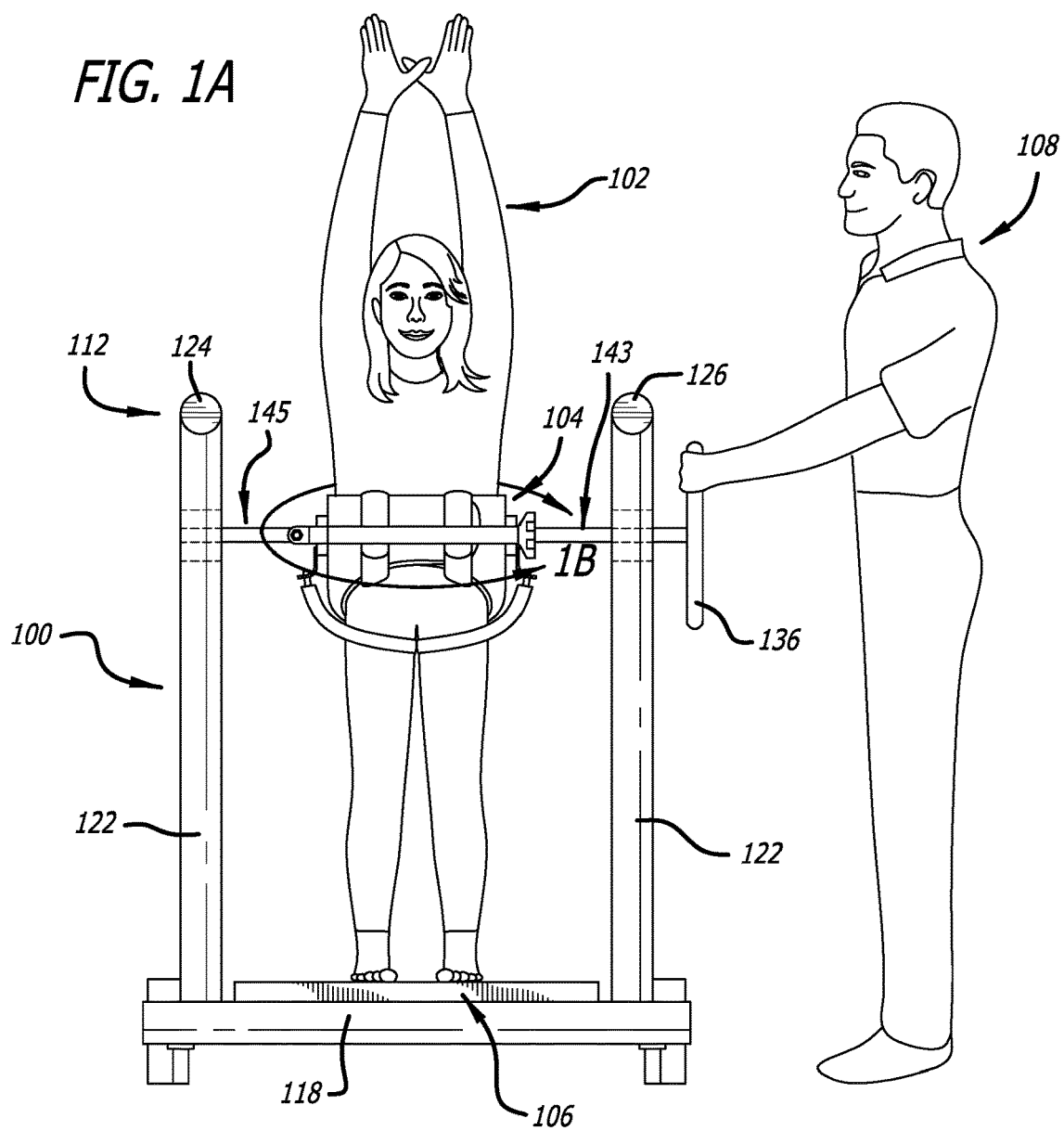
FIG. 1A illustrates an individual in an initial position in an acrobatic training apparatus according to an aspect of the present disclosure.
Figure 1B:
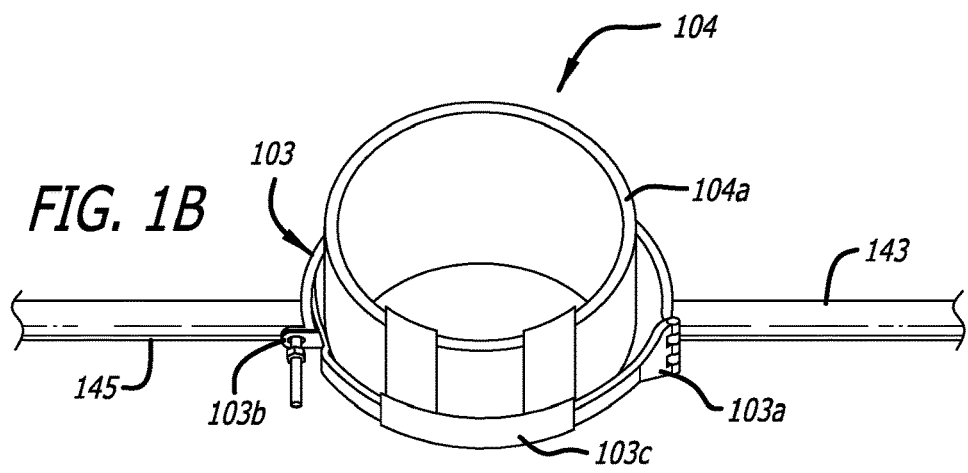
FIG. 1B illustrates a spotting apparatus for use with an acrobatic training apparatus according to an aspect of the present disclosure.
Figure 2:
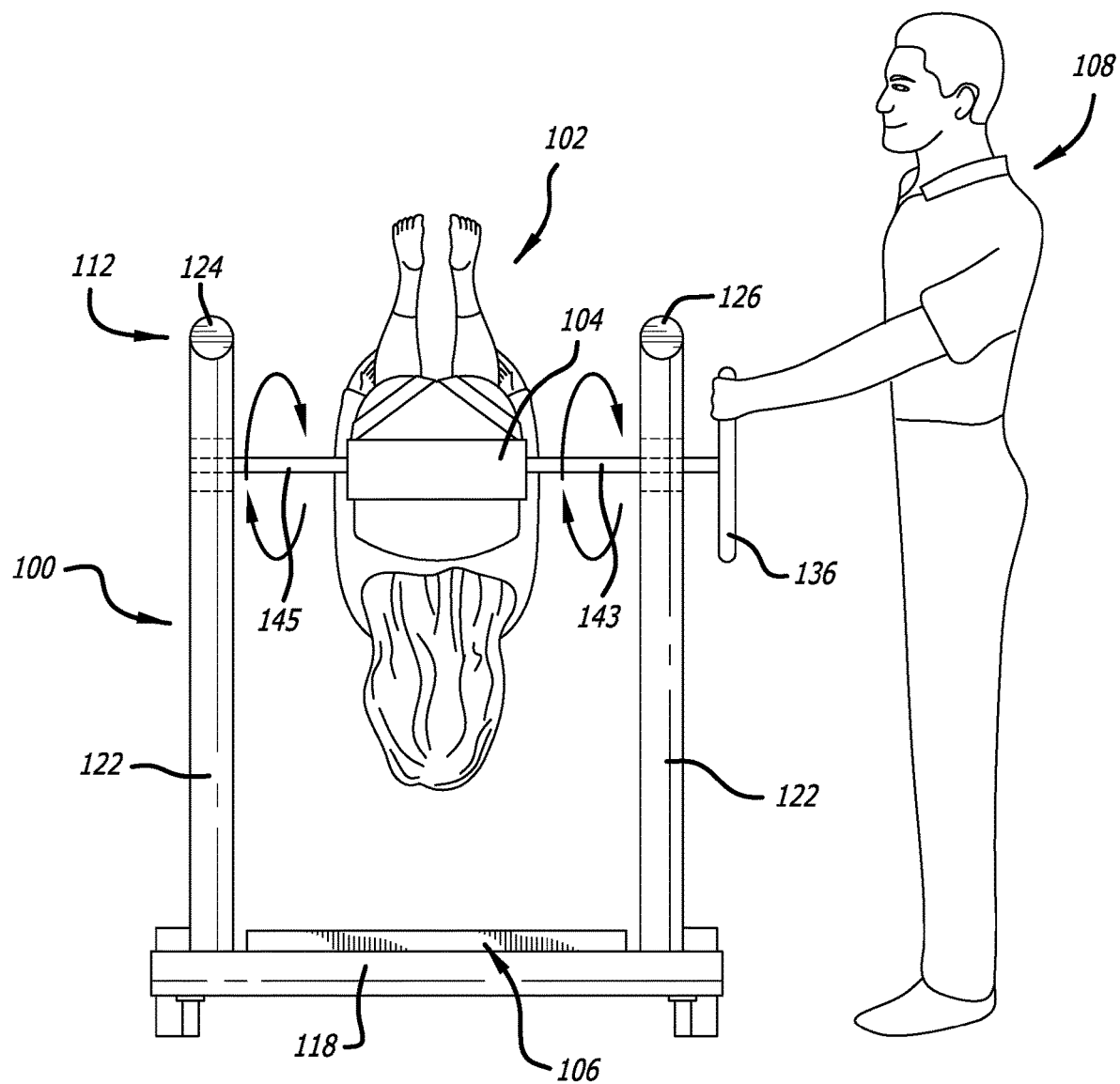
FIG. 2 illustrates the individual in a tuck and rotating position in the acrobatic training apparatus of FIG. 1A.

The present disclosure is directed to a portable acrobatic training apparatus 100 for training athletes in acrobatic moves that are utilized in sports such as gymnastics, diving and the like. FIGS. 1A and 2 illustrate an individual 102 secured within a spotting apparatus 104 of the portable acrobatic training apparatus 100 performing a somersault or flip. FIG. 1B illustrates a spotting apparatus for use with an acrobatic training apparatus according to an aspect of the present disclosure.

As shown in FIG. 1A, the individual 102 may start in an initial position with her arms extending upwardly and then pushes or propels herself off a first elongated base platform 106 of the portable acrobatic training apparatus 100 with her feet. After propelling off the first elongated base platform 106, the individual may then tuck her knees tightly into her chest and rotates around a horizontal axis or plane. In one example, a trainer (e.g. a coach or any other individual) 108 may simultaneously operate a height adjustment mechanism 110 on the portable acrobatic training apparatus 100 to assist the individual 102 in rotating performing a somersault or flip.

Although shown in the figures with a trainer assisting the individual or athlete, the individual may utilize the apparatus independently of a trainer or anyone else and learn to perform acrobatic moves, such as twists and somersaults, either separately or simultaneously. That is, the individual does not need a trainer or other person to utilize the apparatus.

Acrobatic Training Apparatus

FIGS. 1A, 1B and 2-5 illustrate the portable acrobatic training apparatus 100 of the present disclosure according to one embodiment. As shown, the portable acrobatic training apparatus 100 may include a spotting apparatus 104 supported by a main frame 112, having a first elongated base platform 106 mounted thereon and a height adjustment mechanism 110 adjustably mounted on the main frame 112 for assisting the individual 102 in performing a somersault or flip on the acrobatic training apparatus 100.

The first elongated base platform 106 includes first and second parallel base struts 114, 116 (See FIGS. 4-5) connected by a first cross member 118 at a first end and a second cross member 120 connecting the first and second parallel base struts 114, 116 at a second end. The main frame 112 may further comprise elongated vertical members 122 extending vertically upward from the first and second parallel base struts 114, 116. In one example, the acrobatic training apparatus 100 may include four (4) elongated vertical support members 122 extending upwardly from a distal end of the first parallel base strut 114, a proximal end of the first parallel base strut 114, a distal end of the second parallel base strut 116 and a proximal end of the second parallel base strut 116. A first upper support member 124 may be connected between the elongated vertical support members 122 which extend upwardly from the distal end of the first parallel base strut 114 and the proximal end of the first parallel base strut 114. The first upper support member 124 may be parallel to the first parallel base struts 114 in a horizontal plane. A second upper support member 126 may be connected between the elongated vertical support members 122 which extend upwardly from the distal end of the second parallel base strut 116 and the proximal end of the second parallel base strut 116.

Figure 6:
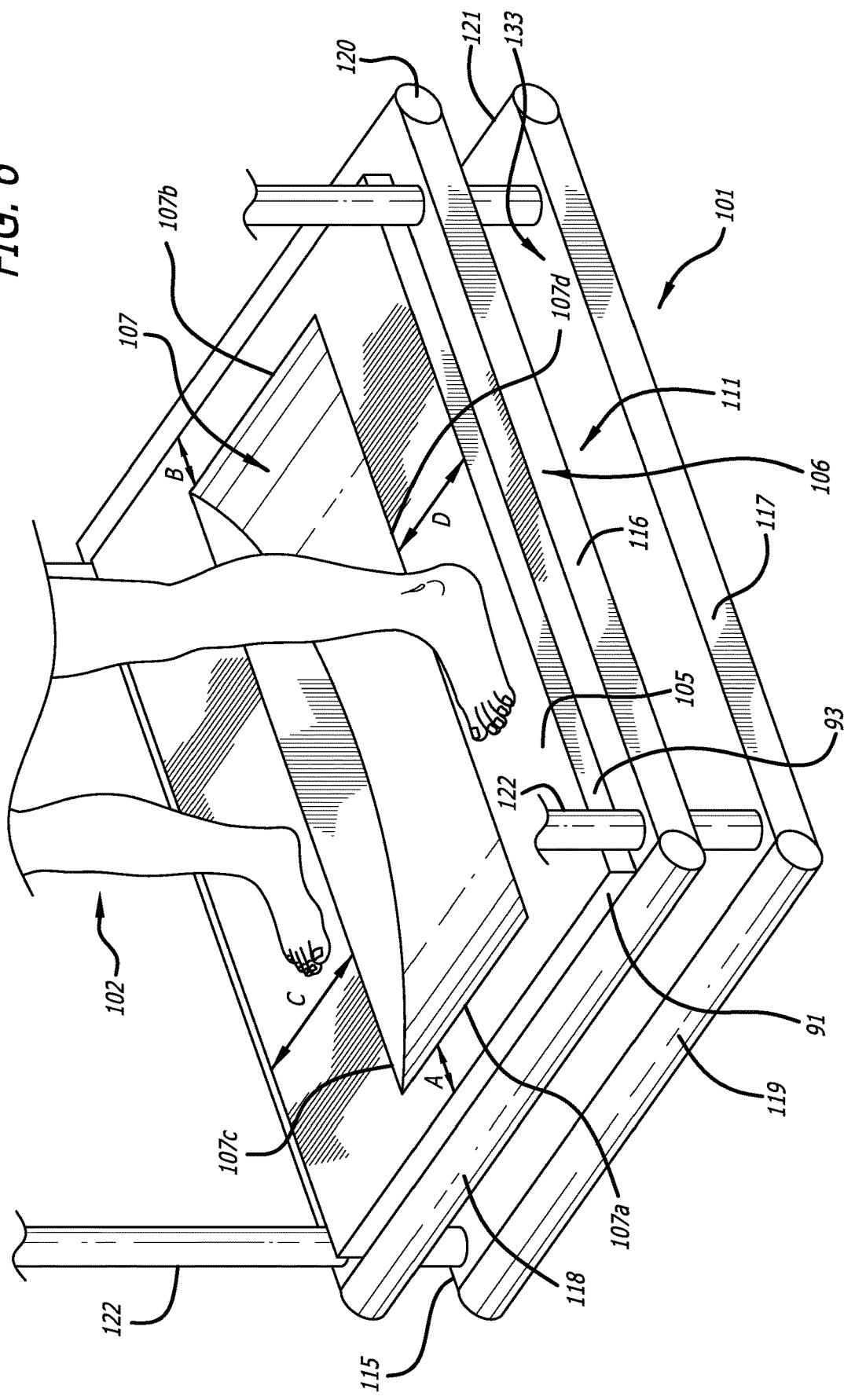
FIG. 6 illustrates a fragmentary view of an individual in an initial position on an acrobatic training apparatus according to another aspect of the present disclosure.
Figure 7:
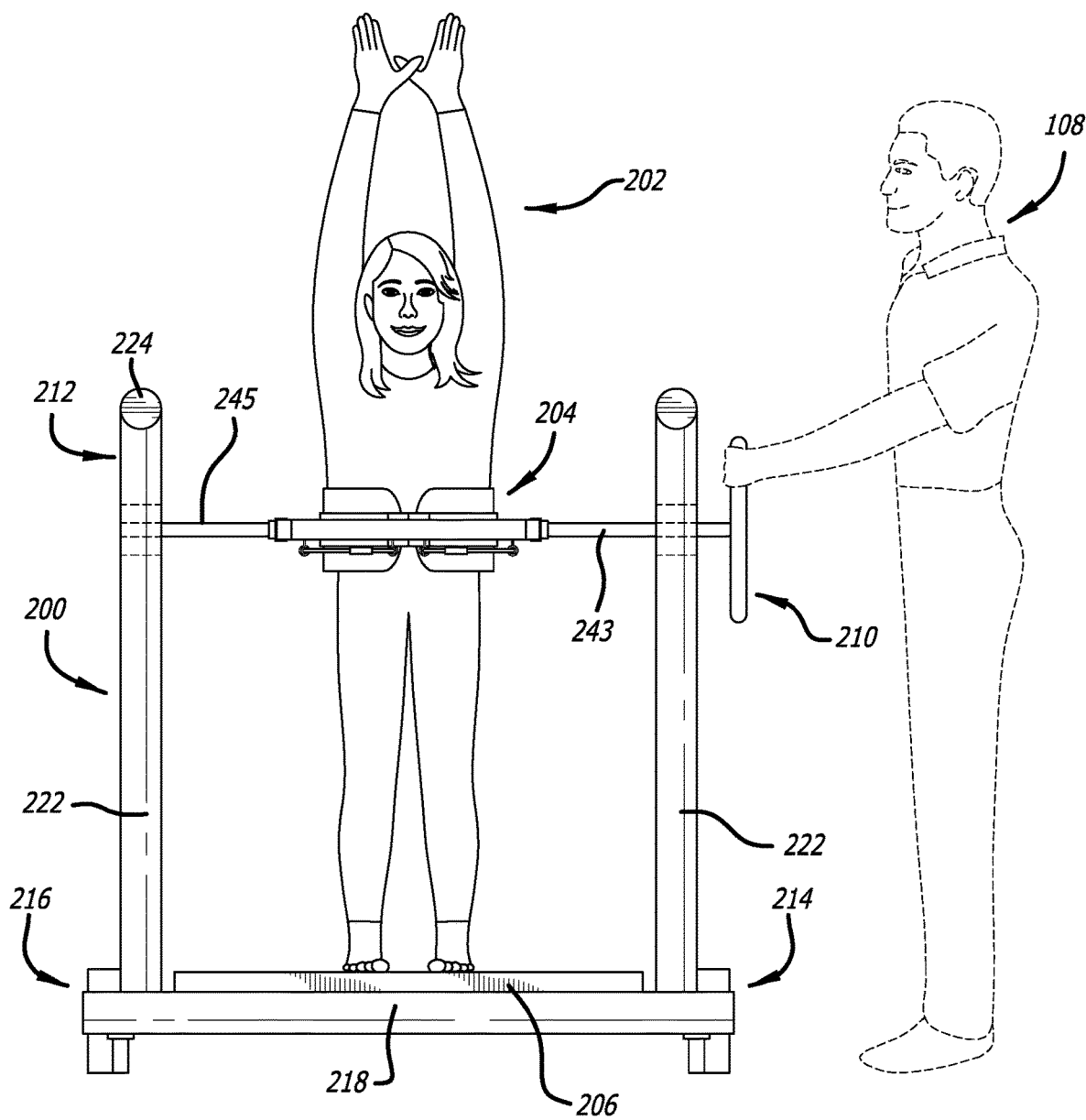
FIG. 7 illustrates an individual in an initial position in an acrobatic training apparatus according to another aspect of the present disclosure.

The height adjustment mechanism 110 may comprise a first pair of spaced apart elongated height adjustment mechanism support members 128a, 128b extending vertically upward from the first parallel base strut 114 and a second pair of parallel elongated height adjustment mechanism support members 130a, 130b extending vertically upward from the second parallel base strut 116 (See FIG. 6). A first slidable support mechanism 132 may be slidably mounted on the first pair of spaced apart elongated height adjustment mechanism support members 128a, 128b and a second slidable support mechanism 134 may be slidably mounted on the second pair of spaced apart elongated height adjustment mechanism support members 130a, 130b. The first slidable support mechanism 132 may comprise a first sleeve 132a and a second sleeve 132b, connected by a first bearing 132c (e.g. a pillow block bearing), the first slidable support mechanism 132 adapted for receiving the first pair of spaced apart elongated height adjustment mechanism support members 128a, 128b. The second slidable support mechanism 134 may comprise a third sleeve 134a and a fourth sleeve 134b, connected by a second bearing 134c (e.g. a pillow block bearing), the second slidable support mechanism 134 adapted for receiving the second pair of spaced apart elongated height adjustment mechanism support members 130a, 130b. The third sleeve 134a and the fourth sleeve 134b of the second slidable support mechanism 134 slide along the second pair of spaced apart elongated height adjustment mechanism support members 130a, 130b. The height adjustment mechanism 110 may further comprise a wheel 136 that may be connected to the second slidable support member 134 for moving the height adjustment mechanism 110 vertically along the first pair of spaced apart elongated height adjustment mechanism support members 128a, 128b and the second pair of spaced apart elongated height adjustment mechanism support members 130a, 130b allowing the acrobatic training apparatus 100 to be adjusted for the height of each individual. The wheel 136 allows the height adjustment mechanism 110 to be moved manually. Alternatively, the height adjustment mechanism 110 may be operated automatically with the use of a motor (not shown). According to one aspect, the first slideable support mechanism 132 and the second slideable support mechanism of the height adjustment support mechanism 110 move in unison as the wheel is turned.

Figure 3:
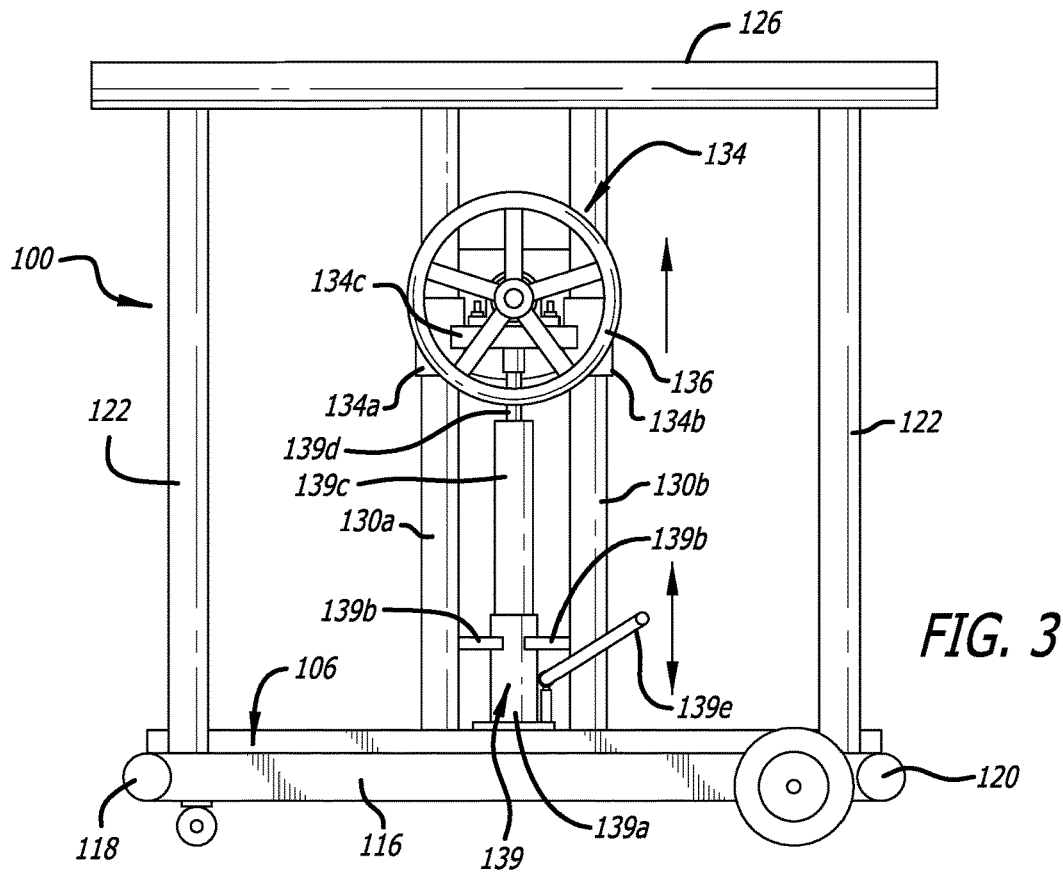
FIG. 3 illustrates a side view of the acrobatic training apparatus according to an aspect of the present disclosure.
Figure 4:
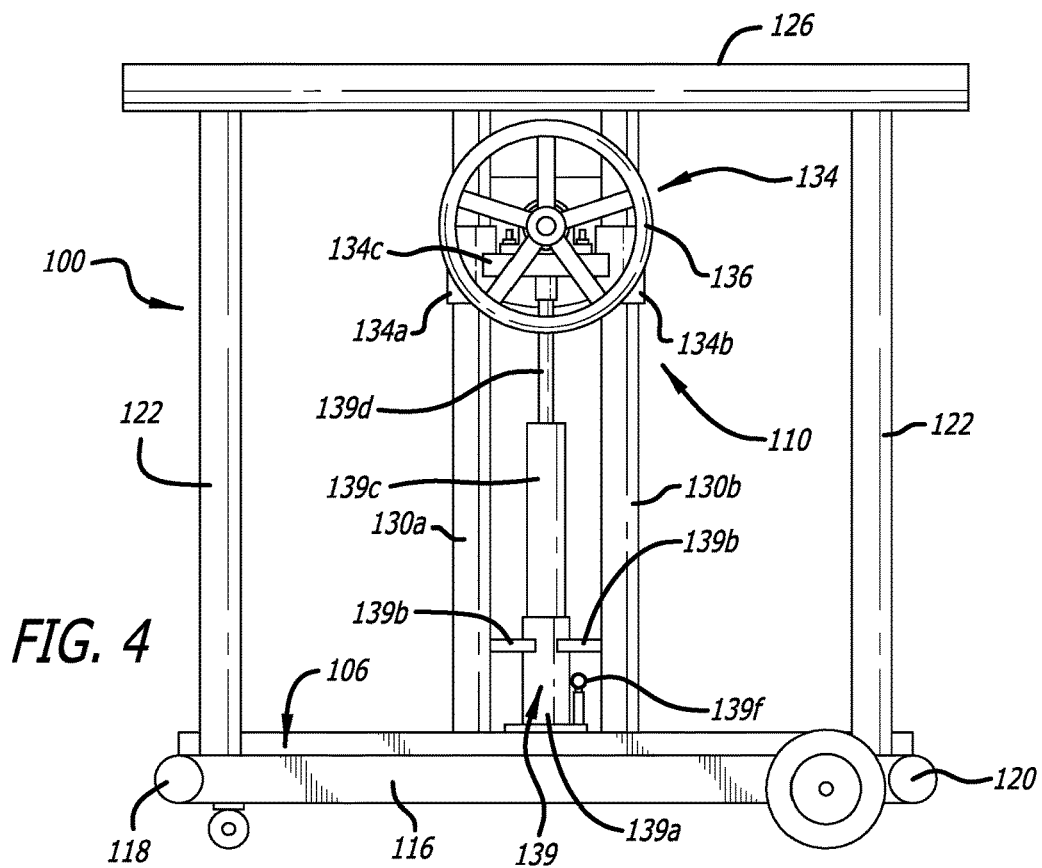
FIG. 4 a side view of the height adjustment mechanism the acrobatic training apparatus in a first position.

According to one example, the height adjustment mechanism 110 may be adjusted by use of a first mechanical lifting device such as a mechanical, hydraulic or pneumatic jack 139 which may be secured to the first elongated base platform 106. The first jack 139 may comprise a base 139a secured to the first elongated base platform 106 and the second pair of spaced apart elongated height adjustment mechanism support members 130a, 130b of the mechanism 110 by jack support members 139b. A cylinder 139c is connected to and extends vertically upward from the base 139a and a vertical lifting ram 139d connected to, and extending vertically upward from, the cylinder 139c, that moves vertically up and down resulting in the movement of the second slidable support mechanism 134. The vertical lifting ram 139d contacts the second bearing 134c of the second slidable support mechanism 134. As can be seen in FIGS. 3-4, the first jack 139 may include a handle rod 139e which may be inserted into an opening 139f of the first jack 139 allowing an individual to manually move the height adjustment mechanism 110 by moving the handle manually up and down.

Figure 5:
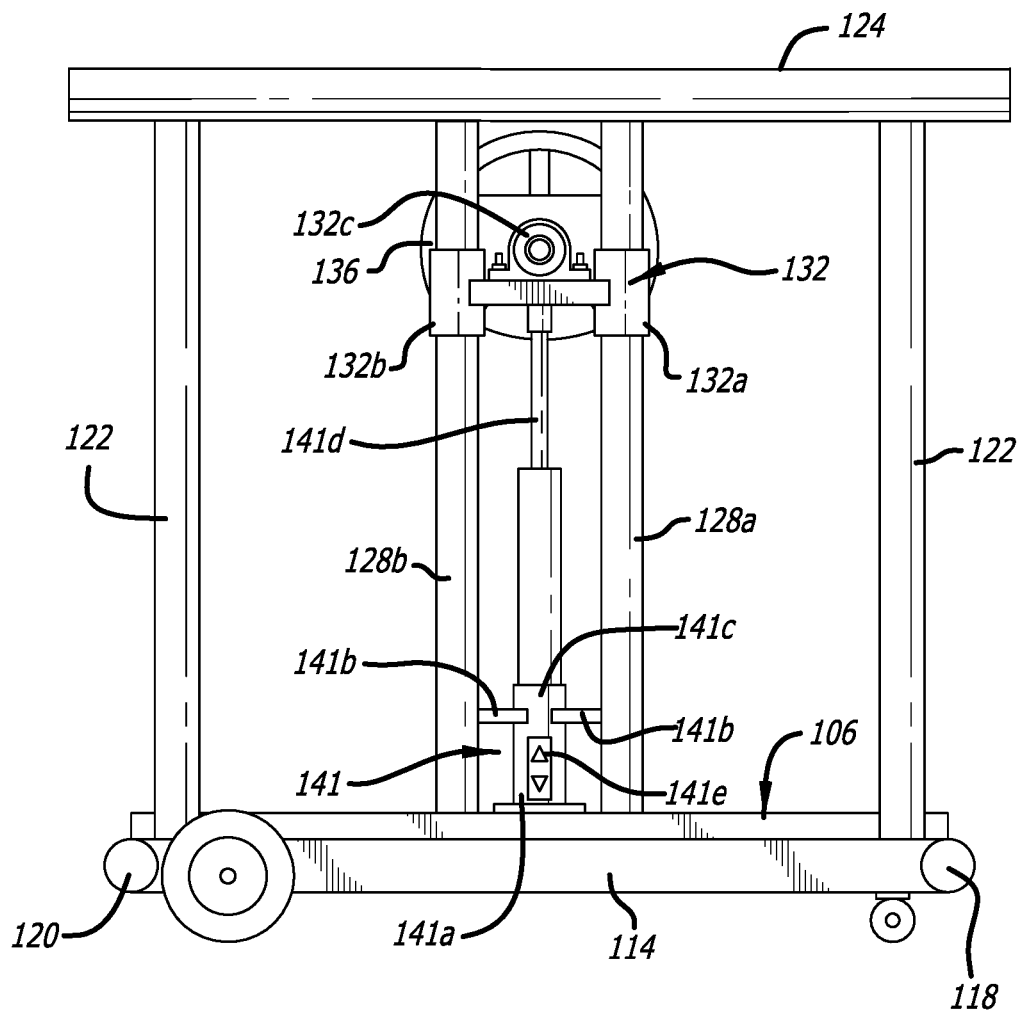
FIG. 5 illustrates a side view of the height adjustment mechanism of the acrobatic training apparatus in a second position.

A second mechanical lifting device such as a mechanical, hydraulic or pneumatic jack 141 may be utilized in unison with the first jack 139 so that both sides of the height adjust mechanism 110 are adjusted at the same time and to the same height. The first and second jacks 139 and 141 are linked or directly connected together so this happens automatically. In other words, the first and second jacks 139, 141 may operate in unison. The second jack 141 may comprise a base 141a secured to the first elongated base platform 106 and the first pair of spaced apart elongated height adjustment mechanism support members 128a, 128b of the mechanism 110 by jack support members 141b (See FIG. 5). A cylinder 141c is connected to and extends vertically upward from the base 141a and a vertical lifting ram 141d that moves vertically up and down resulting in the movement of the first slidable support mechanism 132. The vertical lifting ram 141d contacts the first bearing 132c of the first slidable support mechanism 132. As can be seen in FIG. 5, the second jack 141 may be electrically operated by the pressing of buttons 141e. A motor (not shown) then automatically moves the first slidable support mechanism 132.

As described above, the first and second jacks 139, 141 may operate in unison so that both the first slidable support mechanism 132 and the first slidable support mechanism 134 are adjusted at the same time and to the same height. The first and second jacks 139 and 141 are linked together so this happens automatically. In one example the first and second jacks 139, 141 may be the same. Alternatively, the first and second jacks 139, 141 may be different types of jacks. According to another example, each of the first and second jacks may be moved separately and their movement not linked together.

The spotting apparatus 104 may be rotably or pivotally mounted to a first horizontal arm 143 extending horizontally outward from the first bearing 132c of the first slidable support mechanism 132 and a second horizontal arm 145 extending horizontally outward from the second bearing 134c of the second slidable support mechanism 134. The first and second bearings 132c, 134c provide support for the rotation of the first and second horizontal arm 143, 145, respectively.

The spotting apparatus 104 may include a belt 104a that wraps around the waist of the individual and is adjustable to fit the size of the individual. The spotting apparatus 104 is pivotally secured to the first horizontal arm 143 and the second horizontal arm 145 by a circular member 103 that includes a hinge 103a and a latch 103b allowing a portion 103c of the circular member 103 to open so the individual to gain access to and fit in the spotting apparatus 104.

According to one embodiment, the spotting apparatus 104 may also be referred to as a harness. Additionally, spotting apparatus 104 may be adjustable and come in varying sizes to adapt to the size of the individual. For example, a child under 12 years may need a smaller spotting apparatus and/or belt than an adult. The spotting apparatus 104 shown in FIG. 1B is by way of example only and any type of spotting apparatus known in the art may be used. A second embodiment of the spotting belt will be described in further detail below with reference to FIGS. 9-11.

Opening in Acrobatic Training Apparatus

FIG. 6 illustrates a fragmentary view of an individual 102 in an initial position on an acrobatic training apparatus 101 according to another aspect of the present disclosure. Similar to the acrobatic training apparatus 100 of FIGS. 1A-5, the acrobatic training apparatus 101 of FIG. 6 may include a main frame (partially shown) having a first elongated base platform 106. Unlike the first elongated base platform 106 of FIGS. 1A-5, the first elongated base platform 106 includes a raised section mounted 105 thereon. The raised section 105 is formed by a pair of end portions 91 and a pair of side portions 93 extending between the elongated vertical members 122. The generally rectangular shape is by way of example only and any other shape may be utilized. As shown, an opening 107 may be located in the raised section 105 and has a distance "A" between a front end 107a of the opening 107 and a front end of the raised section 105 and a distance "B" between a back end 107b of the opening 107 and a back end of the raised section 105. In one embodiment, the distances "A" and "B" may be the same or alternatively, the distances "A" and "B" may be different, i.e. the distance of "A" may not be the same as the distance of "B". "A" may be larger or smaller than "B". Additionally, the opening 107 has a distance "C" between a first side 107c of the opening 107 and a first side of the raised section 105 and a distance "D" between a second side 107d of the opening 107 and a second side of the raised section 105. In one embodiment, the distances "C" and "D" may be the same or alternatively, the distances "C" and "D" may be different, i.e. the distance of "C" may not be the same as the distance of "D". "C" may be larger or smaller than "D".

When in use, the individual 102 may straddle opening 107 on the raised section 105 with a foot on each side of the opening 107 when in an initial position. Next, the individual 102 may extend her arms upwardly and push or propel herself off the raised section 105 of the portable acrobatic training apparatus 101 of FIG. 6 with her feet (similar as with the portable acrobatic training apparatus 100 in FIGS. 1A and 2) with her feet. After propelling off the raised section 105, the individual may then tuck her knees tightly into her chest and rotate or alternatively, may keep her knees in a straight position or practice performing a pike position. The opening 107 in the raised section 105 allows the user to not have to tuck her knees into her chest and allows the practice and training of many different acrobatic or diving positions. In other words, the opening 107 in the raised section 105 provides the vertical space necessary for the user to practice all types of movements and not just movements in which the knees are in the tucked position so that the user will not hit the raised section 105.

As discussed above, simultaneously, a trainer (coach) 108 operates a height adjustment mechanism (See FIG. 1A, not shown in FIG. 6) on the portable acrobatic training apparatus 101 to assist the individual 102 in rotating during the acrobatic maneuver. Alternatively, the individual may operate the acrobatic training apparatus 101 without the assistance of a trainer or other individual.

According to one aspect, the vertical depth of the opening 107 increases from the front end 107a and the back end 107b of the opening towards the middle of the opening and reaches its maximum vertical depth in the middle of the opening 107. The opening 107 may be of various sizes to accommodate the sizes/heights of the various individual users. In other words, the opening 107 has a vertical depth which increases from the front end 107a and the back end 107b towards a middle of the opening where a maximum vertical depth is reached.

To ensure that there is enough vertical space for the needed depth of the opening 107. The acrobatic training apparatus 101 may further include a second elongated base platform 133 located below and separated from the first elongated base platform 106 of the acrobatic training apparatus 100 in FIGS. 1A, 1B and 2-5 creating a space 111 to provide additional room for the depth of the opening 107. The second elongated base platform 133 may be connected to the first elongated base platform 106.

Similar to the first elongated base platform 106 of the acrobatic training apparatus 100 described in FIGS. 1A, 1B and 2-5, the second elongated base platform 133 of the acrobatic training apparatus 100 may comprise an unillustrated first parallel base strut 115 and a second parallel base strut 117. The first and second parallel base struts of the second elongated base platform 133 may be connected by a second elongated base platform first cross member 119 at a first end and an unillustrated second elongated base platform second cross member 121 at a second end forming a generally rectangular or square configuration.

The second elongated base platform 133 may be a solid piece of material formed by the struts and cross members being side members or the second elongated base platform 133 may be just a frame formed by the struts and cross members. The first elongated base platform 106 may be connected to the second elongated base platform 133 by the elongated vertical members 122 as shown in FIG. 6 and described above with reference to the acrobatic training apparatus 100 in FIGS. 1A, 1B and 2-5. According to one example, the second elongated base platform 133 is solid and devoid of a platform on top.

In other words, the second elongated base platform 133 may be located below and separated from the first elongated base platform 106. As described above, the second elongated base platform 133 may comprise an unillustrated first parallel base strut 115 having a first end and an opposing second end; a second parallel base strut 117 having a third end and an opposing fourth end; a first cross member 119 connected between the first end of the first parallel base strut 115 and the third end of the second parallel base strut 117; and a second cross member 121 connected between the second end of the first parallel base strut 115 and the fourth end of the second parallel base strut 117.

Acrobatic Training Apparatus

Figure 8A:
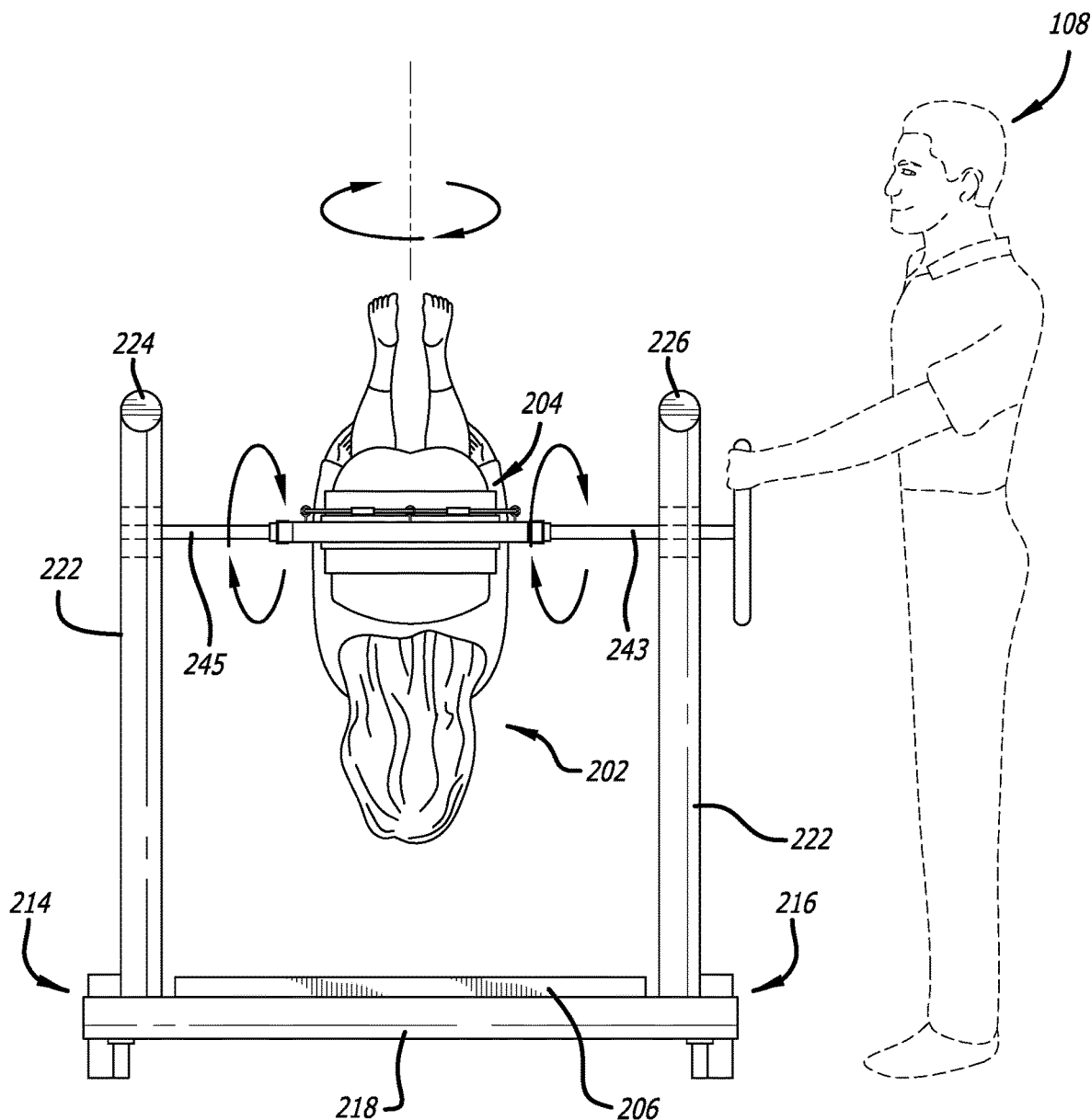
FIG. 8A illustrates the individual in a tuck and spinning position in the acrobatic training apparatus of FIG. 7.
Figure 8B:
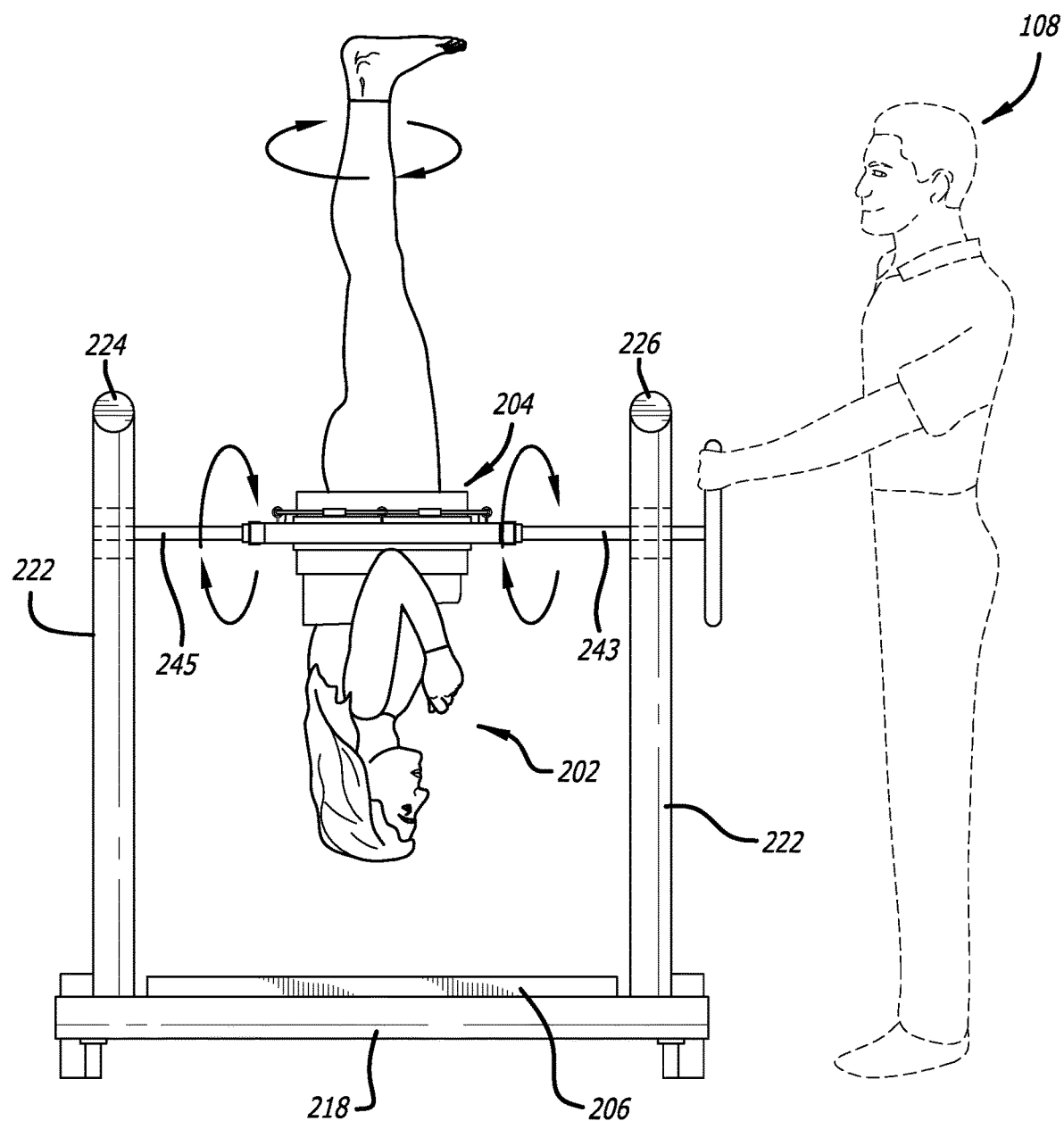
FIG. 8B illustrates the individual in a straight spinning and rotating position in the acrobatic training apparatus of FIG. 7.
Figure 9:
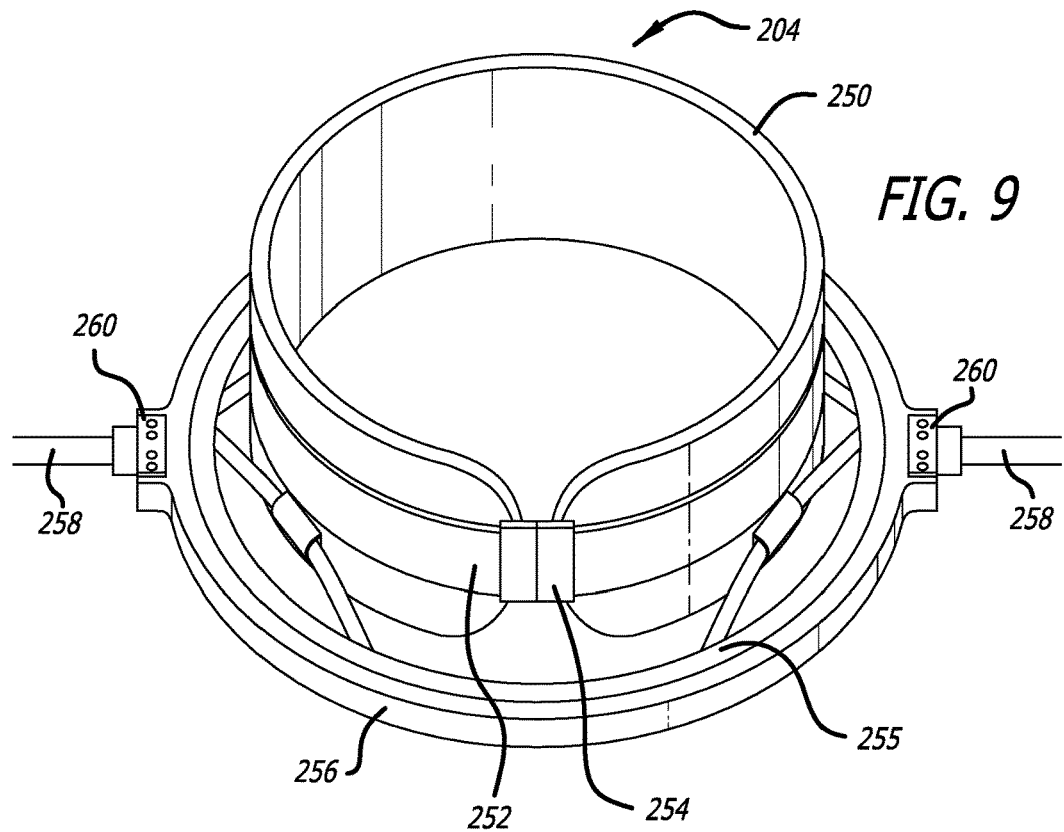
FIG. 9 illustrates a perspective view of a spotting apparatus according to one aspect of the present disclosure.
Figure 10:
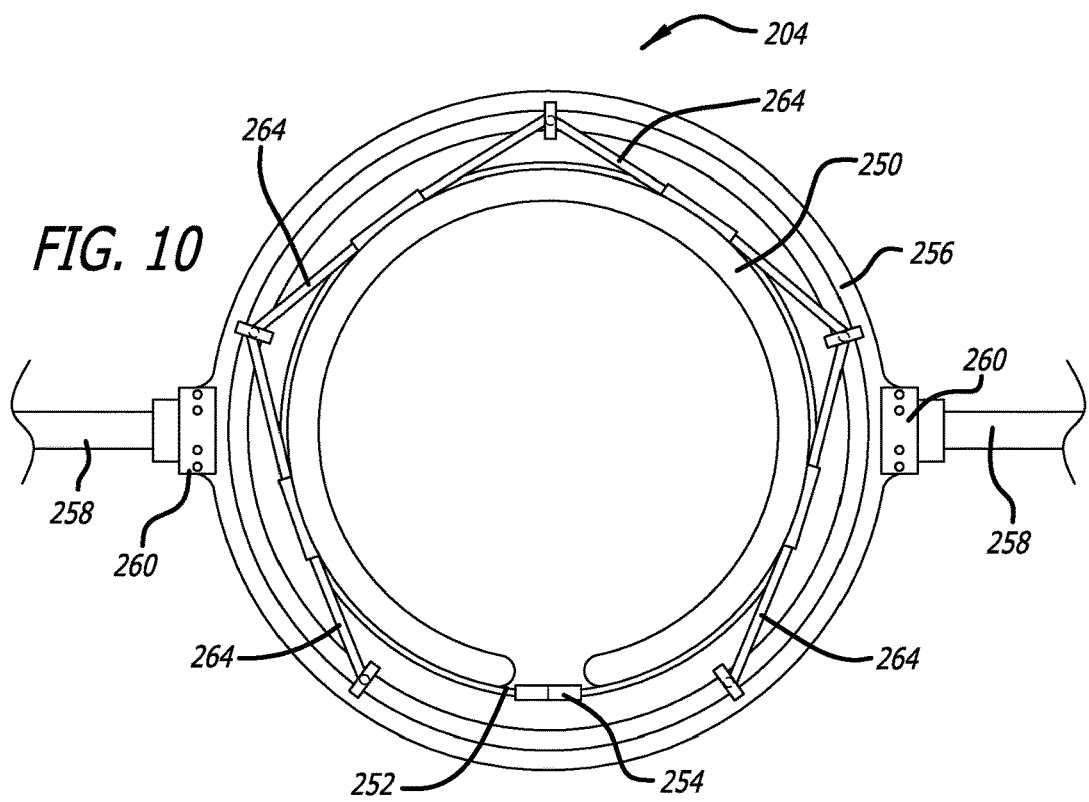
FIG. 10 illustrates a top view of the spotting apparatus of FIG. 9.
Figure 11:
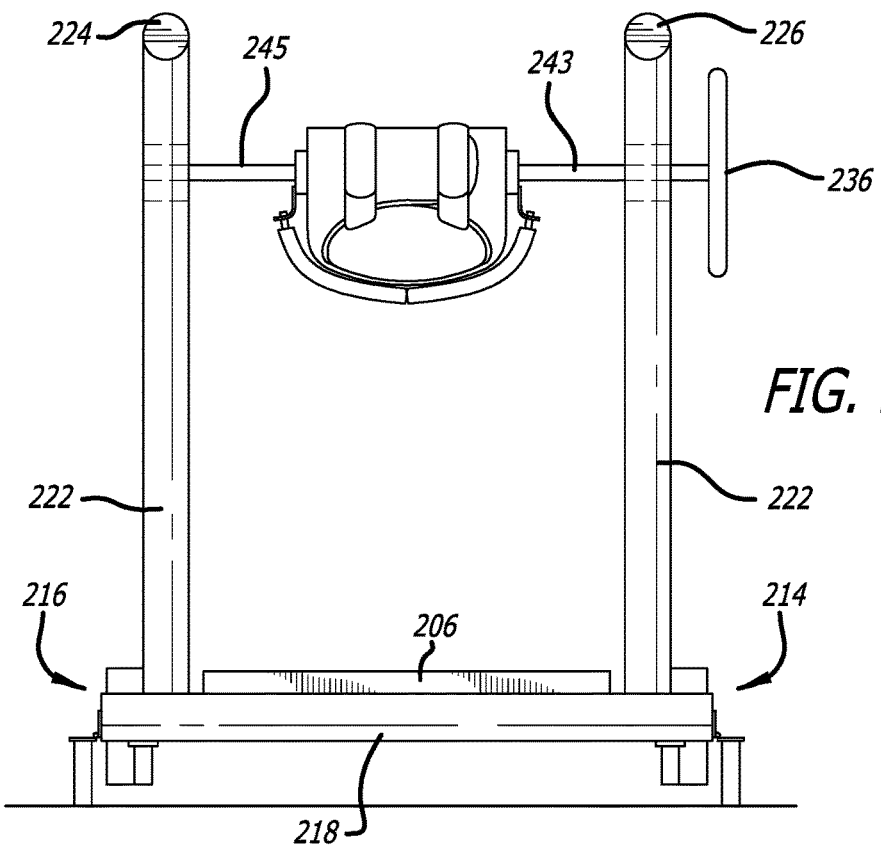
FIG. 11 illustrates a front view of the acrobatic training apparatus according to another aspect of the present disclosure.

FIGS. 7, 8A, 8B, 11 and 12 illustrate a portable acrobatic training apparatus 200 of the present disclosure according to one embodiment. FIG. 8A illustrates the individual in a tuck and spinning position in the acrobatic training apparatus of FIG. 7. FIG. 8B illustrates the individual is a straight spinning and rotating position in the acrobatic training apparatus of FIG. 7. FIGS. 9-10 illustrate an example of a spotting belt or harness that may be utilized with any of the embodiments of the present disclosure.

As shown, the portable acrobatic training apparatus 200 may include a spotting apparatus 204 supported by a main frame 212, a first elongated base platform 206 mounted on the main frame 212 and a height adjustment mechanism 210 adjustably mounted on the main frame 212 for assisting the individual 202 in performing a somersault or flip on the acrobatic training apparatus 200.

The first elongated base platform 206 comprises first and second parallel base struts 214, 216 connected by a first cross member 218 at a first end and a second cross member (not shown), and the second cross member (not shown) connecting the first and second parallel base struts 214, 216 at a second end. The main frame 212 further comprises elongated vertical members 222 extending vertically upward from the first and second parallel base struts 214, 216 of the first elongated base portion 206. In one example, the acrobatic training apparatus 200 includes four (4) elongated vertical support members 222 extending upwardly from a distal end of the first parallel base strut 214, a proximal end of the first parallel base strut 214, a distal end of the second parallel base strut 216 and a proximal end of the second parallel base strut 216. A first upper support member 224 may be connected between the elongated vertical support members 222 extending upwardly from the distal end of the first parallel base strut 214 and the proximal end of the first parallel base strut 214. The first upper support member 224 may be parallel to the first parallel base strut 214 in a horizontal plane. A second upper support member 226 may be connected between the elongated vertical support members 222 which extend upwardly from the distal end of the second parallel base strut 216 and the proximal end of the second parallel base strut 216.

The height adjustment mechanism 210 may comprise a first pair of spaced apart elongated height adjustment mechanism support members (shown as 128a, 128b in FIG. 5) extending vertically upward from the first parallel base strut 214 and a second pair of parallel elongated height adjustment mechanism support members 230a, 230b (See FIG. 12) extending vertically upward from the second parallel base strut 216. A first slidable support mechanism (See Reference number 132 in FIG. 5) may be slidably mounted on the first pair of spaced apart elongated height adjustment mechanism support members (Reference number 128a, 128b in FIG. 5) and a second slidable support mechanism 234 may be slidably mounted on the second pair of spaced apart elongated height adjustment mechanism support members 230a, 230b. The first slidable support mechanism 232 may comprise a first sleeve and a second sleeve, connected by a first bearing (e.g. a pillow block bearing), (See FIG. 5), the first slidable support mechanism 232 may be adapted for receiving the first pair of spaced apart elongated height adjustment mechanism support members (shown as 128a, 128b in FIG. 5). The second slidable support mechanism 234 may comprise a third sleeve 234a and a fourth sleeve 234b, connected by a second bearing 234c (e.g. a pillow block bearing), the second slidable support mechanism 234 adapted for receiving the second pair of spaced apart elongated height adjustment mechanism support members 230a, 230b. The third sleeve 234a and the fourth sleeve 234b of the second slideable support mechanism 234 slide along the second pair of spaced apart elongated height adjustment mechanism support members. The height adjustment mechanism 210 may further comprise a wheel 236 that may be connected to the second slidable support member 234 for moving the height adjustment mechanism 210 vertically along the first pair of spaced apart elongated height adjustment mechanism support members 228a, 228b (not shown, see FIG. 5) and the second pair of spaced apart elongated height adjustment mechanism support members 230a, 230b allowing the acrobatic training apparatus 200 to be adjusted for the height of each individual. The wheel allows the height adjustment mechanism 220 to be moved manually. Alternatively, the height adjustment mechanism 210 may be operated automatically with the use of a motor (not shown). According to one aspect, the first slideable support mechanism 232 and the second slideable support mechanism 234 of the height adjustment support mechanism 210 move in unison as the wheel is turned.

Figure 12:
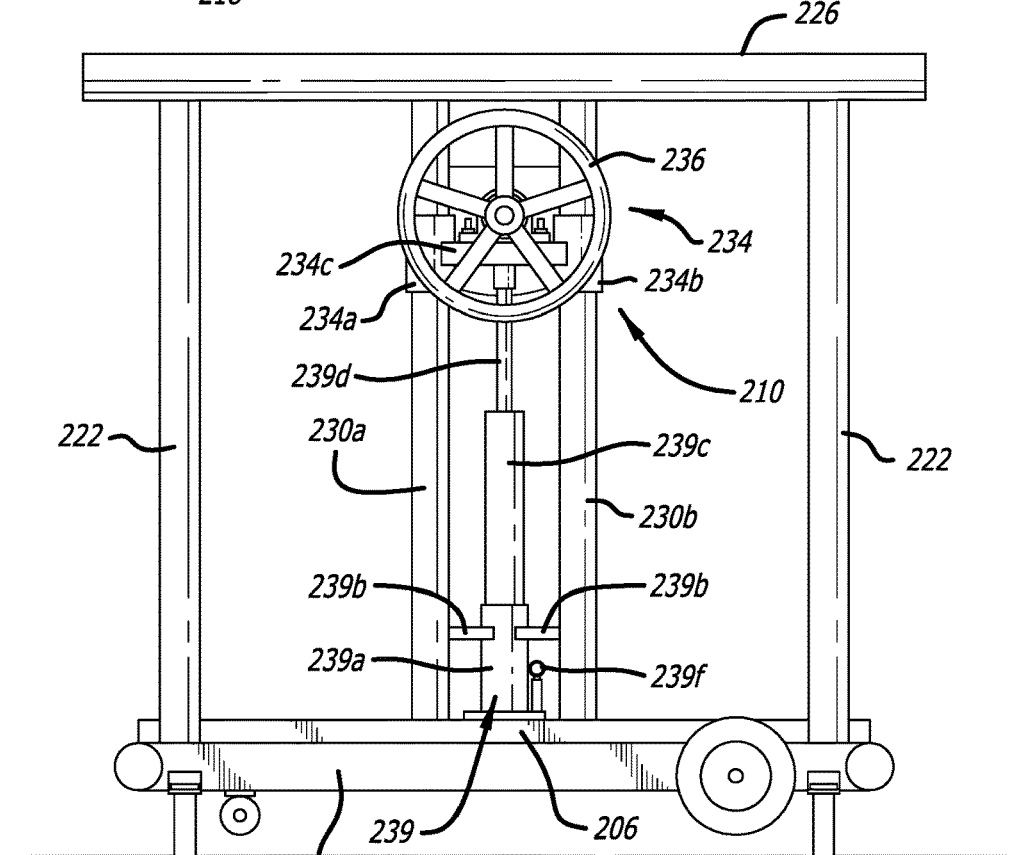
FIG. 12 illustrates a side view of the acrobatic training apparatus of FIG. 11.

According to one example, the height adjustment mechanism 210 may be adjusted by use of a first mechanical lifting device such as a mechanical, hydraulic or pneumatic jack 239 which may be secured to the platform 206. The first jack 239 may comprise a base 239a secured to the platform 206 and the second pair of spaced apart elongated height adjustment mechanism support members 230a, 230b of the mechanism 210 by jack support members 239b. A cylinder 239c is connected to and extending vertically upward from the base 239a and a vertical lifting ram 239d that moves vertically up and down resulting in the movement of the second slidable support mechanism 234. The vertical lifting ram 239d contacts the second bearing 234c of the second slidable support mechanism 234. As can be seen in FIG. 12 the first jack 239 may include an opening 239f for receiving a handle rod (not shown, see FIG. 3) which may be inserted into opening 239f allowing an individual to manually move the height adjustment mechanism 210 by moving the handle manually up and down.

As described above with reference to the portable acrobatic training apparatus 100 of FIGS. 1A, 1B and 2-5 illustrate, a second jack may be utilized in unison, or separately from the jack 239 shown in FIG. 12. The jacks utilized in the portable acrobatic training apparatus 100 in FIGS. 7, 8A, 8B, 11 and 12 may be similar or the same jacks as used with the portable acrobatic training apparatus 100 of FIGS. 1A, 1B and 2-5 described above in detail.

The spotting apparatus 204 may be rotably mounted to a first horizontal arm 243 extending horizontally outward from the second bearing 234c of the first slidable support mechanism (shown as 132 in FIG. 5) and a second horizontal arm 245 extending horizontally outward from an unillustrated first bearing 232c of the second slidable support mechanism 234. The first and second bearings (shown as 132c, 134c in FIG. 5) provide support for the rotation of the first and second horizontal arm 243, 245, respectively. Although not shown, the first bearing of the first slidable support mechanism are the same as in FIG. 5.

According to one embodiment, the harness is interchangeable with spotting belts (or harnesses) of varying sizes to adapt to the size of the diver. For example, a child under 12 years may need a smaller spotting belt than an adult. The harness or spotting belt will be described in further detail below with reference to FIGS. 9-11.

Spotting Apparatus/Twisting Belt

FIG. 9 illustrates a perspective view of a spotting apparatus 204 according to one aspect of the present disclosure. FIG. 10 illustrates a top view of the spotting apparatus 204 of FIG. 9. The spotting apparatus 204 may also be referred to as a rotator belt or a rotating spotting belt that may be used for flipping and twisting for gymnastics, tumbling, trampoline, stung training, spring board diving and any other activity in which an individual rotates and/or twists.

The spotting apparatus 204 may be controlled by an athletic trainer (or the individual/athlete) and is secured to the frame 212 of an acrobatic training apparatus 200. Alternatively, the individual may utilize the apparatus without the assistance of a trainer or any other individual. According to one example, the spotting apparatus 204 may include a band 250 adapted to be received around the waist of the user. In one example, the band 250 may be an elongate pad having an outer layer and a resilient foam interior for engaging the waist of the athlete adjusting for the size of the waste of the individual. The band 250 may be adjusted to conform to the size of each individual user using a belt 252 secured to the band 250 and adjusted with belt locks or a belt buckle 254 providing a safe grip on the hips of the individual.

The spotting apparatus 204 further comprises an outer ring 256 and an inner ring 255 where the inner ring 255 moves or spins within the outer ring 256. The band 250 may be secured to the inner ring 255 allowing the individual to rotate. The outer ring 256 may be rotatably connected to a pair of spaced-apart lateral supports 258 by a pair of pivotal support members 260 (or rotation brackets) that together provide a first axis of rotation, about which the spotting apparatus 204 may selectively rotate. The pair of pivotal support members 260 allow the individual to rotate in a horizontal plane while the inner ring 255 allows the individual to spin in a vertical plane.

According to one aspect, the outer ring 256 can be attached to a strap or over-head spotting rig. In the case of gymnastics and the support members/rotation brackets 260 are connected to a rig, the support members/rotation brackets 260 may include ball bearings which allow the brackets 260 to encircle the entire ring to provide a quick twist for the gymnast or other athlete.

The spotting apparatus 204 may further comprise bungee cords 264 attached to the inner rotator ring 255 and the band 250 at selected locations to act as a stabilizer for the hips of the individual.

One or more of the components and functions illustrated in the previous figures may be rearranged and/or combined into a single component or embodied in several components without departing from the invention. Additional elements or components may also be added without departing from the invention.

While certain exemplary embodiments have been described and shown in the accompanying drawings, it is to be understood that such embodiments are merely illustrative of and not restrictive on the broad invention, and that this invention is not be limited to the specific constructions and arrangements shown and described, since various other modifications may occur to those ordinarily skilled in the art.

The invention claimed is:

1. An acrobatic training apparatus, comprising:
a first elongated base platform having first and second elongated parallel base struts connected by a first elongated cross member at a first end of each of the first and second elongated parallel base struts and a second elongated cross member at a second end of each of the first and second elongated parallel base struts, the first elongated base platform extending in a first horizontal plane;
a second elongated base platform having third and fourth elongated parallel base struts connected by a third elongated cross member at a first end of each of the third and fourth elongated parallel base struts and a fourth elongated cross member at a second end of each of the third and fourth elongated parallel base struts, the second elongated base platform extending in a second horizontal plane and located below and separated from the first elongated base platform;

a plurality of elongated vertical members extending vertically upward from the first elongated base platform, wherein the plurality of elongated vertical members connect the second elongated base platform to the first elongated base platform;

a raised section mounted on the first elongated base platform and having a pair of end portions and a pair of side portions extending between the plurality of elongated vertical members;

a first upper support member integrally connected to a first pair of elongated vertical members of the plurality of elongated vertical members; and a second upper support member integrally connected to a second pair of elongated vertical members of the plurality of elongated vertical members;

a first pair of spaced apart elongated height adjustment support members extending vertically upward from the first elongated parallel base strut; and a second pair of spaced apart elongated height adjustment support members extending vertically upward from the second elongated parallel base strut; and an opening extending vertically into the raised section, wherein the opening has a vertical depth which increases from a front end of the opening to a middle portion of the opening, wherein the vertical depth of the opening decreases from the middle portion of the opening to a back end of the opening.

2. The acrobatic training apparatus of claim 1, wherein the front end of the opening is located a first distance from a first end portion of the pair of end portions of the raised section and a second distance from a second end portion of the pair of end portions of the raised section.

3. The acrobatic training apparatus of claim 2, wherein the first distance is different from the second distance.

4. The acrobatic training apparatus of claim 1, wherein the first upper support member is located parallel to the first elongated parallel base strut and wherein the second upper support member is located parallel to the second elongated parallel base strut.

5. The acrobatic training apparatus of claim 1, further comprising:

a first sleeve slideable along a first spaced apart elongated height adjustment support member of the first pair of spaced apart elongated height adjustment support members;

a second sleeve slidable along a second spaced apart elongated height adjustment support member of the first pair of spaced apart elongated height adjustment support members; and a first bearing connecting the first sleeve to the second sleeve.

6. An acrobatic training apparatus, consisting of:

a first elongated base platform having first and second elongated parallel base struts connected by a first elongated cross member at a first end of each of the first and second elongated parallel base struts and a second elongated cross member at a second end of each of the first and second elongated parallel base struts, the first elongated base platform extending in a first horizontal plane;

a second elongated base platform having third and fourth elongated parallel base struts connected by a third elongated cross member at a first end of each of the third and fourth elongated parallel base struts and a fourth elongated cross member at a second end of each of the third and fourth elongated parallel base struts, the second elongated base platform extending in a second horizontal plane and located below and separated from the first elongated base platform;

a plurality of elongated vertical members extending vertically upward from the first elongated base platform, wherein the plurality of elongated vertical members connect the second elongated base platform to the first elongated base platform;

a raised section mounted on the first elongated base platform and having a pair of end portions and a pair of side portions extending between the plurality of elongated vertical members;

a first upper support member integrally connected to a first pair of elongated vertical members of the plurality of elongated vertical members; and a second upper support member integrally connected to a second pair of elongated vertical members of the plurality of elongated vertical members;

a first pair of spaced apart elongated height adjustment support members extending vertically upward from the first elongated parallel base strut; and a second pair of spaced apart elongated height adjustment support members extending vertically upward from the second elongated parallel base strut; and an opening extending vertically into the raised section, wherein the opening has a vertical depth which increases from a front end of the opening to a middle portion of the opening, wherein the vertical depth of the opening decreases from the middle portion of the opening to a back end of the opening;

wherein the front end of the opening is located a first distance from a first end portion of the pair of end portions of the raised section and a second distance from a second end portion of the pair of end portions of the raised section; and wherein the first distance is different from the second distance.

* * * * *